US006983293B2

(12) United States Patent
Wang (10) Patent No.: US 6,983,293 B2
(45) Date of Patent: Jan. 3, 2006

(54) MID-TIER-BASED CONFLICT RESOLUTION METHOD AND SYSTEM USABLE FOR MESSAGE SYNCHRONIZATION AND REPLICATION

(75) Inventor: Andy I-Shin Wang, Palto Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/205,046

(22) Filed: Jul. 24, 2002

(65) Prior Publication Data

US 2004/0019614 A1 Jan. 29, 2004

(51) Int. Cl.
G06F 12/00 (2006.01)

(52) U.S. Cl. .................. 707/201; 707/203; 707/200
(58) Field of Classification Search ............ 707/1–203; 707/709/200–203, 248
See application file for complete search history.

(56) References Cited

U.S. PATENT DOCUMENTS

| 5,434,994 | A | | 7/1995 | Shaheen et al. | 395/500 |
|---|---|---|---|---|---|
| 5,764,155 | A | * | 6/1998 | Kertesz et al. | 700/295 |
| 5,774,717 | A | | 6/1998 | Porcaro | 707/202 |
| 5,812,773 | A | * | 9/1998 | Norin | 709/204 |
| 5,870,759 | A | * | 2/1999 | Bauer et al. | 707/201 |
| 6,058,416 | A | | 5/2000 | Mukherjee et al. | 709/203 |
| 6,275,831 | B1 | | 8/2001 | Bodnar et al. | 707/201 |
| 6,341,291 | B1 | * | 1/2002 | Bentley et al. | 707/203 |
| 6,421,719 | B1 | * | 7/2002 | Lewis et al. | 709/224 |
| 2002/0010791 | A1 | * | 1/2002 | Kalkunte et al. | 709/238 |
| 2002/0018489 | A1 | * | 2/2002 | Ambe et al. | 370/475 |
| 2002/0087686 | A1 | * | 7/2002 | Cronk | 709/225 |
| 2002/0132609 | A1 | * | 9/2002 | Lewis et al. | 455/412 |
| 2002/0138449 | A1 | * | 9/2002 | Kendall et al. | 705/75 |
| 2002/0161674 | A1 | * | 10/2002 | Scheer | 705/28 |
| 2003/0033324 | A1 | * | 2/2003 | Golding | 707/200 |
| 2003/0220966 | A1 | | 11/2003 | Hepper et al. | 709/203 |
| 2004/0002993 | A1 | * | 1/2004 | Toussaint et al. | 707/104.1 |

FOREIGN PATENT DOCUMENTS

| JP | 3166627 A2 | 7/1991 |
|---|---|---|
| JP | 8137694 A2 | 5/1996 |
| WO | WO200062180 A1 | 10/2001 |

OTHER PUBLICATIONS

N–tier –Articles—Client/Server Overview, N–TIER.COM; ClientServer and the N–TIER Model of Distributed Computing, Microm Information Services, 1999, pp. 1–7.*
W. Robinson: "Automated Assistance For Conflict Resolution in Multiple Perspective Systems Analysis and Operation", 1996, SIGSOFT 96 Workshop.
Ben–Shaul et al.: An Architecture for Multi–User Software Development Environments, ACM–SDE–12/92/VA.
Wang and Cheng: Increasing Production System Parallelism via Synchronization Minimization and Check–Ahead Conflict Resolution, 1995 Inc. Conf. On Parallel Processing.
Kumar et al.: Flexible and Safe Resolution of File Conflicts, Proceedings of the 1995 USENIX Techn. Conf., p. 325, 95–106.
Sidell et al.:" Data Replication in Mariposa", 1063–6382/96 IEEE p. 485.

* cited by examiner

Primary Examiner—Greta Robinison
Assistant Examiner—Linh Black
(74) Attorney, Agent, or Firm—Sandra M. Parker, Esq (57) ABSTRACT

A system, method and a computer usable medium tangibly embodying a program of instructions executable by the computer to perform a computer-based method for providing a conflict detection and resolution in a mid-tier server of a multi-tier client-server communication system which performs message synchronization in a client/mid-tier environment and replication in a mid-tier/server environment. The method defines a client/mid-tier conflict resolution look-up table listing all possible conflict states in the client/mid-tier environment and corresponding action rules, and a mid-tier/server conflict resolution look-up table listing all possible conflict states in the mid-tier/server environment and corresponding action rules. For any detected conflict state the method finds and executes the corresponding action rule.

12 Claims, 3 Drawing Sheets

| MIRROR MESSAGE \ CLIENT MESSAGE | NO CORRESPONDING CLIENT MESSAGE | CORRESPONDING CLIENT MESSAGE HAS NO UPDATE | DELETED CLIENT MESSAGE | CREATED CLIENT MESSAGE | UPDATED CLIENT MESSAGE |
|---|---|---|---|---|---|
| NO CORRESPONDING MIRROR MESSAGE | 1 | 2 | 3 | 4 | 5 |
| CORRESPONDING MIRROR MESSAGE HAS NO UPDATE | 6 | 7 | 8 | 9 | 10 |
| DELETED MIRROR MESSAGE | 11 | 12 | 13 | 14 | 15 |
| CREATED MIRROR MESSAGE | 16 | 17 | 18 | 19 | 20 |
| UPDATED MIRROR MESSAGE | 21 | 22 | 23 | 24 | 25 |

FIG. 4

| MIRROR MESSAGE \ SERVER MESSAGE | NO CORRESPONDING SERVER MESSAGE | CORRESPONDING SERVER MESSAGE HAS NO UPDATE | DELETED SERVER MESSAGE | CREATED SERVER MESSAGE | UPDATED SERVER MESSAGE |
|---|---|---|---|---|---|
| NO CORRESPONDING MIRROR MESSAGE | 1 | 2 | 3 | 4 | 5 |
| CORRESPONDING MIRROR MESSAGE HAS NO UPDATE | 6 | 7 | 8 | 9 | 10 |
| DELETED MIRROR MESSAGE | 11 | 12 | 13 | 14 | 15 |
| CREATED MIRROR MESSAGE | 16 | 17 | 18 | 19 | 20 |
| UPDATED MIRROR MESSAGE | 21 | 22 | 23 | 24 | 25 |

FIG. 5

MID-TIER-BASED CONFLICT RESOLUTION METHOD AND SYSTEM USABLE FOR MESSAGE SYNCHRONIZATION AND REPLICATION

BACKGROUND OF THE INVENTION

1. Field of the Invention

This invention relates in general to database management systems performed by computers, and in particular to a method and system for providing conflict detection and resolution in multi-tier client-server communication environments.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

Lately, with invention of hand-held (client) devices which have a need to communicate with databases on servers, a search for efficient and accurate messaging systems for hand-held devices became important. Some conventional messaging systems only offer message synchronization for two-tier client-server messaging systems. Often, they only allow client-to-server file-to-file synchronization and do not allow message-to-message synchronization, which is much more complicated due to message content and identity options. Sometimes, two-tier messaging systems support only one-way synchronization since they have no server log support and their conflict resolution is in a client-transaction log.

Other conventional messaging systems offer synchronization for three-tier systems which have a client, mid-tier and server, but they have numerous synchronization and replication problems. For example, they cannot detect and handle all cases, they fail to define the cause of a conflict, their server always wins by default, and its action overrides client devices' actions.

Yet other conventional messaging systems offer synchronization in multi-tier client-server environments, which have multiple mid-tiers. However, in those systems a direct synchronization from a tier-0 application (e.g., a calendar application on a hand-held device) to a back-end server (e.g., Lotus Notes or Microsoft Exchange) usually performs poorly due to the computing incompatibility between the limited resources on tier-0 devices and the rich-client synchronization demands from the back-end server. Thus, the most successful conventional n-tier synchronization system synchronizes its tier-0 application with a mid-tier mirror image (a server database backup), instead of the back-end server, to avoid the performance problem. However, this mid-tier mirror image is synchronized or replicated infrequently with the back-end server to exchange the newest delta messages between tier-0 clients (obtained during tier-0 and mirror synchronization) and back-end server data. Moreover, when synchronization systems with mid-tier image synchronization become more complicated, they often fail to detect all possible client/mirror and server/mirror synchronization conflicts and fail to provide complete conflict resolution.

Therefore, there is a need for a simple, optimized and generic method for detection of all possible client/mirror and server/mirror synchronization conflicts which can provide a complete conflict resolution in a multi-tier client-server messaging system.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for providing a conflict detection and resolution in a mid-tier server of a multi-tier client-server communication system which performs message synchronization in a client/mid-tier environment and replication in a mid-tier/server environment. The method defines a client/mid-tier conflict resolution look-up table listing all possible conflict states in the client/mid-tier environment and corresponding action rules, and a mid-tier/server conflict resolution look-up table listing all possible conflict states in the mid-tier/server environment and corresponding action rules. For any detected conflict state the method finds and executes the corresponding action rule.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, a method and a computer usable medium embodying a program of instructions executable by a computer to perform the method of the present invention for a mid-tier-based conflict detection and resolution, usable in multi-tier client-server communication environments for message synchronization and replication. This invention provides unique conflict resolution algorithms for both client-mirror and server-mirror synchronization, detects all possible client/server synchronization conflicts and provides the complete conflict resolution. The method and system of the present invention may be used in a distributed computing environment in which two or more computer systems are connected by a network, such as World Wide Web, including environments in which the networked computers are of different type.

As in other conventional messaging systems, due to the computing incompatibility between the limited resources on tier-0 devices and the rich-client synchronization demands from the back-end server, a messaging system of the present invention uses a mid-tier to synchronize the tier-0 application with a mid-tier mirror image to avoid the performance problem. However, the present invention solves this complicated problem with a more complicated method and system than the conventional system, by using a two-way mid-tier layer software between a server and a client. Therefore, the preferred embodiments of the present invention use a double mid-tier layer software: a client/mid-tier to synchronize the data, and a server/mid-tier to replicate the data.

Thus, the present invention supports a full two-way three-tier synchronization and provides a complete conflict resolution algorithm set which resolves all possible conflict combinations among a client, mid-tier and server. Moreover, the preferred embodiments of the present invention can also support n-tier methods and systems and allow multiple end-users to synchronize their local data with the centralized mid-tier data which may contain data from several servers. Furthermore, the present invention handles messages which are much more complicate to synchronize than files, due to their content and identity complexity. For example, in the present invention a message on a client device and a message on a server machine are not considered the same unless their account, folder, message type, etc., are all identical.

Therefore, the system and method of the present invention provide a unique computing solution for resolving all possible conflicts in a multi-tier computer architecture. They solve the problems from the prior art of incomplete synchronization conflict detection and resolution with a method and system which completely detect and resolve all possible synchronization conflicts. Moreover, they allow a user to define the proper resolution action for each conflict in advance. Furthermore, the user can override the server's default action. The preferred embodiments of the present invention are incorporated in the PIMConflictResolution module included in the product Personal Information Adapter (PIM Adapter) developed for IBM DB2 Everyplace Sync Server. However, they may be implemented in any other product performing conflict resolution in a client-server communication messaging system.

PIM Adapter is designed to provide platform-independent synchronization of multi-tier messaging systems which can support multiple messaging servers and PIM applications on different mobile devices. For example, a tier-0 PIM application may be a mail or calendar application, a to-do list, memo or address book, located on a client mobile device, such as a hand-held device like Palm Pilot. A back-end source messaging server may be Lotus Notes, a Microsoft Exchange Server or the like. In this document MS Exchange Server, SyncML, and Palm OS are only utilized to illustrate some exemplary details of the design and implementation of the PIM Adapter and the preferred embodiments of the present invention may utilize other servers, as well.

PIM Adapter implements the thin-client/thick-server convention where data encoding/decoding is done at a source messaging server as much as possible, so that a client device has to do much less data manipulation, and a mid-tier server has a replication database where the data is periodically replicated from the source messaging server to minimize resource impact on the source messaging server and to obtain faster turn around for client synchronization requests.

Once the IBM synchronization product DB2 Everyplace Sync Server (Sync Server) is installed on a mid-tier server machine, a Sync Server administrator creates and defines synchronization applications by selecting adapters (e.g. PIM Adapter, File Adapter, DB2 Adapter, etc.) and resources to be synchronized using the Sync Server. On the server side resources may include a set of Exchange Server folders; on the client side resources may include a set of Palm PDBs. Then, the Sync Server client executable (Sync Client) and the selected application configurations can be downloaded into a user's mobile device and be ready to be executed.

Figure 1:
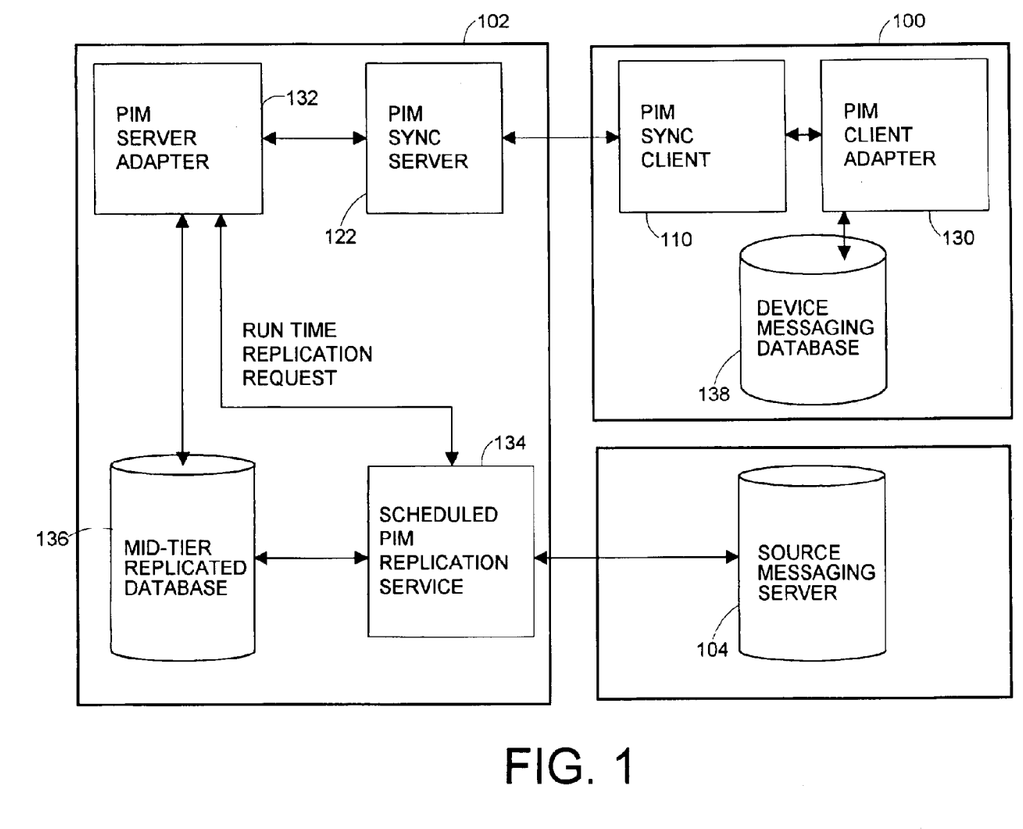
FIG. 1 illustrates a synchronization data flow in a client, mid-tier (mirror) and source server communication environment, according to the preferred embodiments of the present invention.

FIG. 1 illustrates a synchronization data flow in a client device 100 using a PIM Sync Client 110, a mid-tier (mirror) server 102 using a PIM Sync Server 122, and a source server 104, such as a Source Messaging Server. The client 100 has a processor and memory (not shown). Each server 102 and 104 also has a processor and memory (not shown) and is connected to one or more electronic storage devices, such as disk drives, that store one or more relational databases. They may comprise, for example, optical disk drives, magnetic tapes and/or semiconductor memory.

Each storage device permits receipt of a computer usable medium, such as a magnetic media diskette, magnetic tape, optical disk, semiconductor memory and other machine-readable storage device, and allows for method program steps recorded on the computer usable medium to be read and transferred into the client 100 or server 102, 104 memory. The recorded program instructions may include the code for the method embodiment of the present invention. Alternatively, the program steps can be received into the operating memory from a computer over the network.

Data storage and retrieval is accomplished with queries against a database stored on an electronic storage device. In the present invention, these queries conform to the Structured Query Language (SQL) standard, and invoke functions performed by a DataBase Management System (DBMS), such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries and to non-relational databases.

As is shown in FIG. 1, PIM Adapter has two components: a PIM Client Adapter 130 and a PIM Server Adapter 132.

The same FIG. 1 also shows a synchronization data flow between the PIM Client Adapter 130, the PIM Sync Client 110, the PIM Sync Server 122, the PIM Server Adapter 132 and a Scheduled PIM Replication Service 134, as well as their interaction with other mid-tier server 102 components, such as a Mid-tier Replicated database 136 at the mid-tier server 102 and a Device Messaging Database 138 at the client 100.

Synchronization starts when the client 100 mobile device user clicks on one of the downloaded applications, previously created and defined by the Sync Server administrator, which are shown in the client 100 device's frame window. Following description relates to an exemplary implementation of the preferred embodiments of the present invention where the mobile device is a Palm Pilot, its selected synchronization application contains only one adapter, the PIM Client Adapter 130, and one resource, the Inbox category of the Palm Mail PDB. Once clicked on, the the Palm Mail PDB and packages them in synchronization messages ready to be sent to a Sync Server adapter, such as the PIM Server Adapter 132.

Once the PIM Server Adapter 132 receives the synchronization messages sent from the client device 100 it performs the following steps. First, it finds the set of MS Exchange server folders to be synchronized in this run, previously defined by the Sync Server administrator. Next, it collects all server delta messages from the server folders and conducts a conflict resolution of the present invention with the client delta messages embedded in the synchronization messages. Then, it prepares the reply messages ready to be sent back to the PIM Client Adapter 130.

Preferably, the server delta messages from the server folders are all obtained from the Mid-tier Replicated Database 136 tables instead of the Source Messaging Server 104. Therefore, Scheduled PIM Replication Service 134 is running periodically in the background based on the replication schedule, which can also be configured by the Sync Server administrator. However, if a folder in focus has not been recently replicated, the PIM Server Adapter 132 first invokes the Scheduled PIM Replication Service 134 to replicate the message content at run time, before it continues to synchronize the folder contents.

Figure 2:
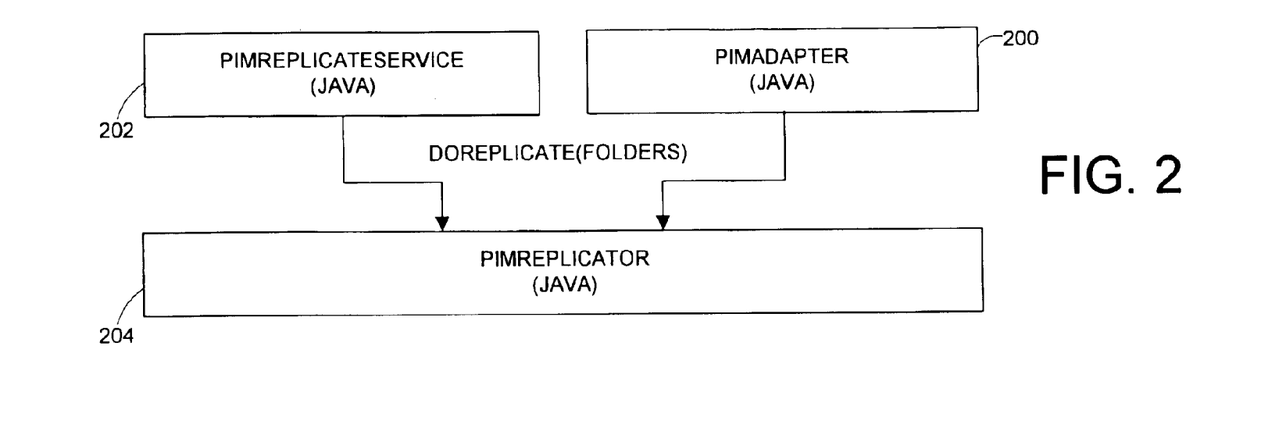
FIG. 2 illustrates a data flow and interactions between the PIMAdapter, PIMReplicateService and PIMReplicator, according to one implementation of the preferred embodiments of the present invention.
Figure 3:
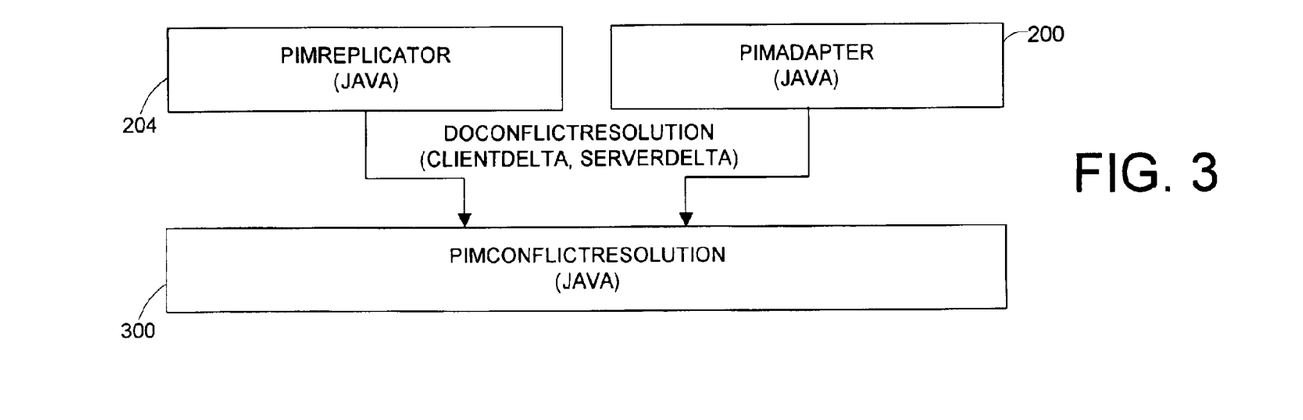
FIG. 3 illustrates a data flow and interactions between the PIMAdapter, PIMReplicator and PIMConflictResolution, according to one implementation of the preferred embodiments of the present invention.

The mid-tier server 102 has two major software components: the PIM Server Adapter 132 and Scheduled PIM Replication Service 134. PIM Server Adapter 132 defines following classes for routines: a PIMAdapter 200, a PIMConflictResolution 300, data conversion, etc. Scheduled PIM Replication Service 134 defines following classes for routines: a PIMReplicateService 202 and a PIMReplicator 204. FIG. 2 illustrates a data flow and interactions between the PIMAdapter 200, PIMReplicateService 202 and PIMReplicator 204. FIG. 3 illustrates a data flow and interactions between the PIMAdapter 200, PIMConflictResolution 300 and PIMReplicator 204. The PIMConflictResolution 300 module is an implementation of a routine which performs according to the preferred embodiments of the present invention.

PIMAdapter 200 implements SyncCallBack modules which handle incoming and outgoing synchronization messages. PIMAdapter 200 handles state recovery and logging, requests a run time replication, if needed, processes the incoming starting messages and determines the client id and subscription id, which defines the adapter type and associated resources, such as server 104 folders. PIMAdapter 200 uses the subscription id to compare with the SUBSCRIPTION_ID column values in the PIM_RESOURCES table, to find out all corresponding FOLDER_ID column values. The client id found previously is used to compare with the CLIENT_ID column values in the PIM_CLIENTS table, to find a corresponding TIMESTAMP to be used in one of following steps. If there is no match, PIMAdapter 200 creates a record in the PIM_CLIENTS table for this client and the TIMESTAMP value is set to NULL, meaning negative infinity.

PIMAdapter 200 also processes a sequence of delta messages and determines the target paths of the client's resources (e.g. the Inbox category of PalmPilot's Mail PDB). It uses the found subscription id and client folder path information to compare with the CLIENT_TARGET_PATH and SUBSCRIPTION_ID column values in the PIM_RESOURCES table to find out a corresponding FOLDER_ID column value, if there is a match. It also prepares the set of client delta messages and server delta messages before calling the PIMConflictResolution 300 method to conduct conflict resolution, invoked separately for every one of the client delta messages and server delta messages. These routines convert each client message, sent from PIM Client Adapter 130, into the client delta message that includes the following information: folder ID of each client message, delta message type, mapped mirror message ID, if there is a match in PIM_MIRROR_CATALOG table. They also obtain a set of mirror delta messages for a server folder, to create, delete, and update delta message sets which contain mirror delta messages whose TIMESTAMP is newer than the client delta message TIMESTAMP.

After detecting a conflict, the PIMConflictResolution 300 module returns a set of numbers each corresponding to a rule/action to be taken by the PIMAdapter 200, which executes the actions according to each rule (e.g. to update related records in corresponding PIM_XXX_MIRROR tables). Next, for each action the PIMAdapter 200 creates reply messages which are then sent back to the PIM Client Adapter 130. It also updates the CLIENT_MESSAGE_ID columns in a PIM_MAP table, once the replied mapping messages (pairs of SERVER_MESSAGE_ID, CLIENT_MESSAGE_ID mapping) are received from the client 100. Then, the client message ID values need to be updated for newly created messages on the server 104 side.

In this implementation, the PIMConflictResolution 300 is designed to be used by both PIMAdapter 200 and PIMReplicator 204. Its primary module, doConflictResolution (String mirrorMessageID, int deltaType, PIMMirrorDeltaSet deltaSet), checks the input parameters and figures out the appropriate rule number to return to its caller. It is invoked for each client or server delta message separately. If it finds a matched mirror/client or mirror/server message pair, it changes the hash value of that hash key, by a mirror message id, from PIMDeltaType.IN to PIMDeltaType.REMOVED, so that it can identify duplicated client or server delta messages and distinguish mirror-only delta messages (marked "IN") from the other kind of delta messages (e.g. client-only, server-only, client-mirror matched, and server-mirror matched). When the doConflictResolution() is called for each client or server message and the appropriate action (CREATE, DELETE or UPDATE) on the client, mirror or server database is completed according to the returned rule numbers for all those non-mirror-only delta messages, the caller (PIMAdapter 200 or PIMReplicator 204) starts processing the rest of delta messages which are still marked as IN (i.e. the mirror-only delta messages).

PIMMirrorCatalogData routine implements modules to insert, update, and delete the corresponding records in PIM_MIRROR_CATALOG table and a module which returns a mirror message ID key, having a delta message type value which is either IN or REMOVED. The returned mirror delta messages are those mirror messages whose TIMESTAMPs are either newer than the client's TIMESTAMP in PIM_CLIENTS table or newer than the server folder's TIMESTAMP in PIM_FOLDERS table.

Scheduled PIM Replication Service 134 is preferably written in C++ and implements the NT service installation/removal, serviceStart() and serviceStop(). It also has a PIMJVMAgent, which is a general C++ wrapper class of JNI code to invoke JVM and Java programs, specifically. Further, it includes the PIMReplicateService 202 module, written in Java, which implements scheduling and requests replication by calling the PIMReplicator 204 and does all the logging.

PIMReplicator 204 is written in Java and is designed for both PIMReplicateService 202 and PIMAdapter 200 clients. PIMReplicator 204 is responsible for preparing the sets of server and mirror delta messages before calling the PIMConflictResolution 300 module to conduct conflict resolution, invoked for every server 104 message. In preparation of delta messages PIMReplicator 204 checks the SERVER_TYPE column in the PIM_FOLDERS table and figures out which PIMMessagingServer-compliant DLL needs to be dynamically loaded. Methods in the PIMMessagingServerProxy object are invoked to obtain the set of server delta messages. It also obtains the set of mirror delta messages for a folder and returns created, deleted, and updated delta message sets whose mirror messages TIMESTAMP is newer than the server folder's TIMESTAMP. Upon receiving the return value of the PIMConflictResolution 300 method, which is a set of rule numbers, PIMReplicator 204 executes the actions accordingly (e.g. to update related records in corresponding PIM_XXX_MIRROR tables).

PIM Server Adapter 132 needs the following tables for storing persistent information. PIM_CLIENTS table is used for storing client information, and get/set by PIMAdapter 200. It has the following fields: CLIENTS, CLIENT_ID which is a foreign key matching the parent key, TIMESTAMP to record the timestamp of the last successful synchronization done by this client, and PIM_CLIENT_ID used to match the MODIFIER_ID column in PIM_MIRROR_CATALOG table. PIM_SERVERS table is used for storing server 104 information for this resource. Its columns are set by PIMAdmin and used by PIMReplicator 204, PIMAdapter 200, and PIMConflictResolution 300, etc. SERVER TYPE column indicates the type of the messaging server 104 (0:Lotus Note, 1:Exchange Server, 2:IMAP4, 3:POP3, 4:SMTP). SERVER_ID identifies the server into which a user should logon. SERVER_ID is a foreign key which matches the parent key, SERVER_ID, in the parent table.

PIM_FOLDERS table is used to identify the folder this resource is about. It is used by PIMReplicator 204, PIMAdapter 200, and PIMConflictResolution 300 module.

FOLDER_PATH column stores the name and path of the messaging server 104 folder that the client 100 is synchronizing with. PIM TYPE column stores the type of the folder (0: address, 1:calendar, 2:mail, 3:memo, 4:to-do). This column is used by utilities that need access to PIM_XXX_MIRROR tables (e.g. PIMReplicator 204). TINESTAMP column records the timestamp of the last successful replication for this folder. This column is set by PIMAdapter 200 and used by PIMReplicator 204. REPLICATION_FREQUENCY column records the frequency to replicate the folder in focus. CLIENT_FOLDER_PATH column holds the name and path of the client folder that server 104 is synchronizing with.

PIM_MIRROR_CATALOG table has a FOLDER_ID column which identifies the folder the message belongs to. MIRROR_MESSAGE_ID column uniquely identifies a record in PIM_XXX_MIRROR tables. SERVER_MESSAGE_ID column refers to the message id of a message in the messaging server 104 database. It is set by the PIMAdapter 200 and PIMReplicator 204 and it could be null if it was either created/updated/deleted by a client and has not been replicated or was reset to null due to a conflict resolution action (e.g. mirror/server conflict resolution rules 14, 17, 18, and 20). TIMESTAMP column records the timestamp of the last create/update/delete operation done by the PIMAdapter 200 or PIMReplicator 204 which get/set it. DELTA TYPE column indicates the type of the delta (0:CREATED, 1:DELETED, 2:UPDATED). MODIFIER_ID column stores the last client (PIM_CLIENT_ID) or server (SERVER_ID) which caused any changes made to this mirror 102 data message. This information is needed when querying the PIM_MIRROR_CATALOG table for mirror data messages which are newer than a given time (either client's last successful synchronization time or a server folder's last successful replication time), and more updates could be generated due to result of other client's synchronization or replication processing. As either a client's new successful synchronization time or a server folder's new replication time is based on the newest TIMESTAMP of all mirror delta messages found in synchronization or replication, this is a way to distinguish duplicated delta message from real delta message next time when the same client or folder comes back. This column is not updated unless the create/update/delete is initiated either by the client 100 or server 104 (e.g. mirror/client and mirror/server conflict resolution rules 3, 4, 5, 8, 10, 13, 18, and 23).

When a CREATED mirror message has a SERVER_MESSAGE_ID which is not null and TIMESTAMP is newer than its corresponding server folder's TIMESTAMP, it is not considered as a delta message to the folder's server as this message was created by the same server in previous replication. Thus, every created message has to be in one of the following states: a message whose SERVER_MESSAGE_ID column is null, and a message whose SERVER_MESSAGE_ID column is not null and its MODIFIER_ID is the same as the creator server's SERVER_ID.

The following condition states when a mirror catalog message is deleted by setting DELETED in delta message type to save space in PIM_MIRROR_CATALOG table. It is done when a mirror catalog message whose SERVER_MESSAGE_ID column is null and its corresponding client message cannot be found in the PIM_MAP table. When a server 104 message is deleted, its corresponding mirror catalog message's SERVER_MESSAGE_ID is set to NULL, its delta message type is set to DELETED. Thus, there are no mirror messages whose SERVER_MESSAGE_ID column is not null yet TIMESTAMP column is older than its corresponding folder's TIMESTAMP because such records should be deleted right after its replication and its SERVER_MESSAGE_ID should be set to NULL afterwards. Thus, every DELETED message in PIM_MIRROR_CATALOG table has to be in either one of the following states: a message whose SERVER_MESSAGE_ID column value is null and its corresponding client message has been found at least once in PIM_MAP table (i.e., it was deleted by a server 104); a message whose SERVER_MESSAGE_ID column value is not null and its TIMESTAMP column value is newer than its folder's TIMESTAMP value (i.e. it was deleted by a client).

If a DELETED message is picked up in next synchronization as a delta message because its TIMESTAMP is newer than a client's TIMESTAMP, but if no map entry can be found for this catalog message for the same client previously, then it should not be considered as a delta message. Same can be applied to server 104 as server should never look into a DELETED delta message whose SERVER_MESSAGE_ID is NULL, as there is nothing the server can do about it.

In addition, PIM Server Adapter 132 defines five PIM specific PIM_XXX_MIRROR content tables: PIM_ADDRESS_MIRROR, PIM_EXTENSION_MIRROR, PIM_CALENDAR_MIRROR, PIM_MAIL_MIRROR, PIM_MEMO_MIRROR and PIM_TODO_MIRROR table. Each one of the PIM_XXX_MIRROR tables contains MIRROR_MESSAGE_ID, TIMESTAMP, and other PIM specific columns. The columns in PIM_XXX_MIRROR tables are set by PIMAdapter 200 and PIMReplicator 204 and are used in get instruction by PIMAdapter 200 and PIMConflictResolution 300.

PIM_MAP table is utilized for storing the mapping between mirror message ID and the device dependent message ID. CLIENT MESSAGE ID column refers to the message id of a message in device messaging database (in Palm PDB case, it is the record id). This column is get/set by PIMAdapter 200. CLIENT_MESSAGE_ID column could have NULL value as there are times a map entry is created (as in mirror/client rule 16) or updated (as in mirror/client rule 23) with NULL client message ID first and the value is not available until the client returns a new one. PIM_CLIENT_ID is a foreign key which matches the parent key, ID, in the parent table DSY PIM_CLIENTS. This column is get/set by PIMAdapter 200. FOLDER ID column identifies the folder and is a foreign key which matches the parent key, FOLDER_ID, in the parent table PIM_FOLDERS. This column is get/set by PIMServerDelta. MIRROR_MESSAGE_ID column uniquely identifies a record in PIM_MIRROR_CATALOG table. This column is set by PIMServerDelta and get by PIMAdapter 200. The primary key is defined as: CLIENT_ID+FOLDER_ID. PIM_MAP table is needed to map unique keys between the Source Messaging Server 104 and Device Messaging Database 138.

Regarding TIMESTAMP assignment and usage, every time when a new client 100 is requesting her/his first synchronization, a new record is created in PIM_CLIENTS table initialized with her/his CLIENT_ID value and NULL-valued TIMESTAMP. When a client's TIMESTAMP value is used to compare with the TIMESTAMP columns of the records in PIM_MIRROR_CATALOG table, a client's NULL-valued TIMESTAMP is considered as negative infinity. In a synchronization cycle, the following simple algorithm is used to decide the new value for a client's TIMESTAMP, a folder's TIMESTAMP, and updated records' TIMESTAMP. When a data message is altered in PIM_XXX_MIRROR tables, the TIMESTAMP column of its corresponding mirror catalog message is updated accordingly. Since there is no way of knowing when a mirror delta message is deleted by a database in general, the TIMESTAMP column of a mirror catalog message is set to the time when its DELTA_TYPE is changed to DELETED. The new TIMESTAMP value for a client or a server folder is the maximum of the TIMESTAMP values of all mirror delta messages collected during the execution of the synchronization or replication.

Conflict Resolution Rules

When the PIMConflictResolution 300 module incorporating the method embodiment of the present invention collects the mirror/client delta messages and mirror/server delta messages, if it finds an intersection between them it starts conducting a conflict resolution. A conflict is defined when "to-be-applied" or "applied" operations cause inconsistent states between the client 100 and mirror 102, or between mirror 102 and server 104. For example, mirror/client conflict resolution rule 14 is a conflict: a creation operation on client 100 side and a deletion operation on mirror 102 side are causing inconsistent state in PIM_MIRROR_CATALOG table. However, in the mirror/client conflict resolution rule 18, a deletion operation on client 100 side and a creation operation on server 104 side will not cause inconsistent state in PIM_MIRROR_CATALOG table.

Figure 4:
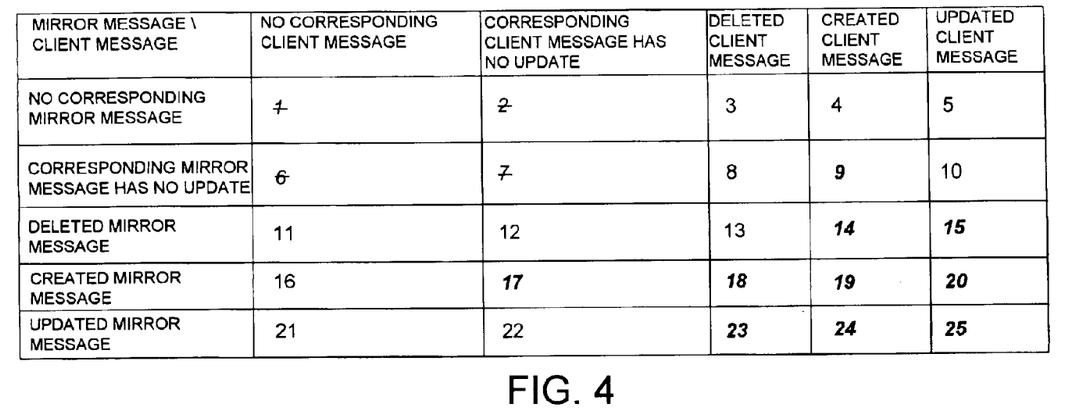
FIG. 4 illustrates a look-up table listing all possible combinations of mirror/client delta messages and their corresponding conflict resolutions actions, according to the preferred embodiments of the present invention.

The preferred embodiments of the present invention utilize two look-up tables containing all possible rules pertaining to conflict resolution. The look-up table of FIG. 4 lists all possible (although some could be non-existent) combinations of mirror/client delta messages and their corresponding conflict resolutions and actions, if there are any. "No Corresponding Mirror/Client Message" means that given a message (client or mirror), PIMAdapter 200 cannot find its corresponding record in a PIM_MAP table. "Corresponding Mirror/Client Message has no Update" means that, given a message (client or mirror), PIMAdapter 200 finds its corresponding record in the PIM_MAP table (whose MIRROR_MESSAGE_ID column points to a record in PIM_MIRROR_CATALOG table) with no update since last synchronization. In FIG. 4 conflicting combinations are shown in Bold Italic. Non-existent combinations are shown in Italic.

Rule 1 combination does not trigger conflict resolution because PIMAdapter 200 does not deal with non-existent records in the PIM_MAP table. Rule 2 combination does not trigger conflict resolution as PIMAdapter 200 does not deal with non-updated client messages. Rule 3 is used when a client message is to be deleted but no corresponding mirror message can be found in the PIM_MAP table; this is not a conflict as the state is consistent and neither client nor mirror should have the message. Rule 4 is used when a new client message is to be created and there should not be any corresponding mirror message. PIMAdapter 200 should create a new mirror catalog message in PIM_MIRROR_CATALOG table with its DELTA_TYPE set to CREATED, and its MODIFIER_ID set to the client's PIM_CLIENT_ID, and the client message converted to a new mirror data message in corresponding PIM_XXX_MIRROR table. Next, it should set the new mirror data message's MIRROR_MESSAGE_ID column to the MIRROR_MESSAGE_ID column value of the new mirror catalog message, set the new catalog message's TIMESTAMP column to the TIMESTAMP column value of the new mirror data message, and create a new map entry (with the new mirror message ID and the client message ID) in the PIM_MAP table.

Rule 5 is invoked when a client message is updated but no corresponding mirror message can be found in the PIM_MAP table. This should not be considered as a conflict because the user may have created a message first and updated it later before the synchronization starts. PIMAdapter 200 should conduct the same resolution as specified in rule 4. Rule 6 combination does not trigger conflict resolution as PIMAdapter 200 does not deal with non-updated mirror messages. Rule 7 combination does not trigger conflict resolution as PIMAdapter 200 does not deal with non-updated client and mirror messages. Rule 8 is invoked when a client message is to be deleted and its corresponding mirror message is found with no update. Then, PIMAdapter 200 should delete the entry in the PIM_MAP table, check to see if the mirror catalog message has a null SERVER_MESSAGE_ID and there are no more PIM_MAP entries which point to this mirror catalog message, and, if so, delete this mirror catalog message from PIM_MIRROR_CATALOG table because there are no more clients who knew about this message; otherwise, it should change the state of the mirror catalog message to DELETED, its TIMESTAMP to CURRENT TIMESTAMP, and its MODIFIER_ID to the client's PIM_CLIENT_ID, and delete the mirror data message from its corresponding PIM_XXX_MIRROR table.

Rule 9 combination could happen when either a previous message is resent (so nothing is done in that case) or a client message id is recycled by client (e.g., after hot sync in Palm). When the latter should happen, it is a conflict as the existing mirror catalog message now points to nothing and could not be recovered (as least for this client) until a refresh is done. Thus, PIMAdapter 200 should log an error so that the administrator is alarmed to check to see if there are too many recycled client IDs from the same client, send back to client a conflict SML command with the existing client message ID indicating that the state is inconsistent now and a refresh follow up is recommended, then stop the synchronization, and when a refresh request is received, PIMAdapter 200 should delete all entries for this client in the PIM_MAP table first, and delete the corresponding mirror messages which point to no client messages (i.e. no PIM_MAP table entries point to these mirror catalog messages), and point to no server messages (i.e. with null SERVER_MESSAGE_ID column). PIM Client Adapter 130 should stop the synchronization and notify user with the conflict, because user may choose to fix the client messages in conflicts or restart with a refresh request.

Rule 10 is invoked when a client message is to be updated and its corresponding mirror message is found with no update. Then, PIMAdapter 200 should convert the client message to a new mirror data message and update the existing one in corresponding PIM_XXX_MIRROR table and set the existing mirror catalog message's DELTA_TYPE column to UPDATED and TIMESTAMP column to the TIMESTAMP column value of the updated mirror data message, and its MODIFIER_ID to the client's PIM_CLIENT_ID. Rule 11 is invoked when a mirror message is to be deleted but no corresponding client message can be found in the PIM_MAP table. This is not a conflict as the stage is consistent and neither client nor mirror should have such message. Rule 12 is invoked when a mirror message is to be deleted and its corresponding client message in the PIM_MAP table is not altered by client. It deletes the corresponding map entry, checks to see if the mirror catalog message has a null SERVER_MESSAGE_ID and there are no more PIM_MAP table entries which point to this mirror catalog message, and if so, deletes this mirror catalog message from the PIM_MIRROR_CATALOG table; otherwise, it does nothing. Next, it sends back to client 100 a deletion SML command with the client message ID.

Rule 13 is invoked when a mirror message is to be deleted; as its corresponding client message in the PIM_MAP table is also deleted by client 100, so there is no conflict. PIMAdapter 200 should delete the corresponding PIM_MAP table entry, and check to see if the mirror catalog message has a null SERVER_MESSAGE_ID and there are no more PIM_MAP table entries which point to this mirror catalog message, and, if so, delete this mirror catalog message from PIM_MIRROR_CATALOG table; otherwise it does nothing. Rule 14 combination could happen when either a previous message is resent (nothing is done in that case) or a client message id is recycled by client (e.g. after hot sync in Palm); when the latter one should happen, it should be considered as a conflict, as stated in rule 9, and the action is the same. Rule 15 is invoked when a mirror message is to be deleted but its corresponding client message in the PIM_MAP table is updated by client; this is a conflict and mirror wins by default. Then, PIMAdapter 200 should check to see if the mirror catalog data has a null SERVER_MESSAGE_ID and there are no other PIM_MAP table entries which point to this mirror catalog message. If so, it deletes this mirror catalog message from PIM_MIRROR_CATALOG table; otherwise, it does nothing. Next, it sends back to client a conflict SML command and a deletion SML command with the existing client message ID. PIM Client Adapter 130 should delete the corresponding client message.

Rule 16 is invoked when a new mirror message is to be created. Then, there should not be any corresponding client message in the PIM_MAP table before the synchronization is done. A new client message should be created by the PIM Client Adapter 130 accordingly. PIMAdapter 200 should convert the new mirror data message to a new client message, create a new map entry (with mirror message ID and NULL client message ID) in the PIM_MAP table, send back to client a creation SML command with the new client message, wait for client to create the client message and return the new client message ID, and update the newly created map entry (with mirror message ID and the returned new client message ID) in the PIM_MAP table.

Rule 17 combination could only happen when a mirror message id is recycled by the underlining PIM_MIRROR_CATALOG table. When this happens it is a conflict as the server 104 state is inconsistent because it did not record the deletion but only the creation and it causes the corresponding client message to map to nothing. Then, PIMAdapter 200 logs an error so that the administrator is alarmed to check and fix the problems later, creates new entries (with CLIENT_ID and FOLDER_ID) in PIM_REFRESH table for all clients which have created corresponding map entries to this mirror catalog message, sends back to client a conflict SML command with the client message ID indicating that the previous mapping is corrupted, and when a refresh request is received, PIMAdapter 200 deletes all entries for this client in the PIM_MAP table, and then deletes the corresponding mirror messages which have no corresponding map entries in the PIM_MAP table and have NULL SERVER_MESSAGE_ID columns. Then, PIM Client Adapter 130 should stop the synchronization and notify user with the conflict, and user may choose to fix the client messages in conflicts or restart with a refresh request.

Rule 18 combination can happen when a mirror message id is recycled. When this happens, it is a conflict and PIMAdapter 200 should conduct the same conflict resolution as specified in rule 17. Rule 19 combination could happen when both client and mirror recycled the client message ID and mirror message ID, respectively. When this should happen, it is a conflict and PIMAdapter 200 logs an error so that the administrator is alarmed to check to see if there are too many recycled client IDs from the same client, and conducts the same conflict resolution as specified in rule 17. Rule 20 combination could happen when a mirror message id is recycled. When this happens it is a conflict and PIMAdapter 200 should conduct the same resolution as specified in rule 17.

Rule 21 is invoked when a mirror message is to be updated but no corresponding client message in the PIM_MAP table can be found; this should not be considered as a conflict because a mirror message could have been created first and then updated later by server before the synchronization starts. PIM Client Adapter 130 should create a client message accordingly. Then, PIMAdapter 200 should convert the new mirror data message to a new client message, send back to client a creation SML command with the new client message, wait for client to create the client message and return the new client message ID, and create a new map entry, with mirror message ID and the returned new client message ID, in the PIM_MAP table. Rule 22 is invoked when a mirror message is updated but its corresponding client message in the PIM_MAP table is not altered by client. Then, PIMAdapter 200 converts the mirror data message to a new client message, and sends back to client an update SML command with the client message ID to be updated client message.

Rule 23 is invoked when a mirror message is to be updated but its corresponding client message in the PIM_MAP table is deleted by client; this is a conflict and mirror wins by default. Then, PIMAdapter 200 should convert the updated data mirror message to a new client message, update the existing PIM_MAP entry with NULL CLIENT_MESSAGE_ID to make it known that there is a pending client message ID on the way, send back to client a conflict SML command with the client message ID, a creation SML command with the new client message, wait for client to return the new client message ID, and update the existing PIM_MAP table entry with the returned new client message ID. Rule 24 combination could happen when either a previous message is resent (nothing is done in that case) or a client message id is recycled by client (e.g., after hot sync in Palm); when the latter one should happen, it should be considered as a conflict as stated in rule 9 and the action is the same. Rule 25 is invoked when a mirror message is to be updated and its corresponding client message in the PIM_MAP table is updated by client; since PIM Server Adapter 132 does not know which properties/columns were updated, this should be considered as a conflict and mirror wins by default. Then, PIMAdapter 200 should convert the new data mirror message to a new client message, and send back to client a conflict SML command with the client message ID, and update SML command with the new client message.

Figure 5:
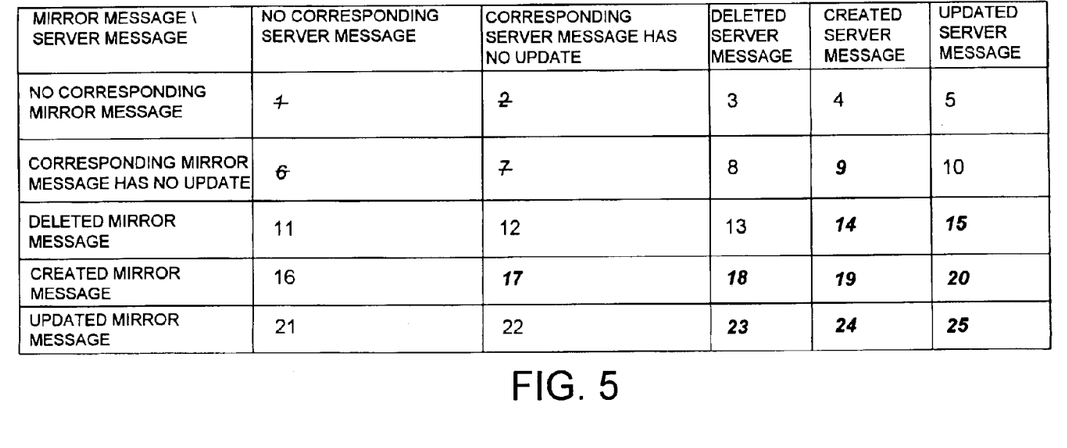
FIG. 5 illustrates a look-up table listing all possible combinations of mirror/server delta messages and their corresponding conflict resolutions actions, according to the preferred embodiments of the present invention.

The look-up table of FIG. 5 lists all possible (although some could be non-existent) combinations of mirror/server delta messages and their corresponding conflict resolutions and actions, if there are any. "No Corresponding Server Message" means that for an existent mirror message in PIM_MIRROR_CATALOG table its SERVER_MESSAGE_ID column value is null. "No Corresponding Mirror Message" means that for a server message's SERVER_MESSAGE_ID values there is no matched mirror messages in the PIM_MIRROR_CATALOG table. "Corresponding Mirror Message has no Update" means that for a server message there is a corresponding mirror message whose TIMESTAMP is older than the folder's TIMESTAMP (i.e. the mirror message is not altered since last synchronization). "Corresponding Server Message has no Update" means that for a mirror message in the PIM_MIRROR_CATALOG table there is a corresponding server message which is not altered by server (i.e., the messaging server 104 does not report any delta message regarding that server message). Conflicting combinations are shown in Bold Italic. Non-existent combinations are shown in Italic. Given a folder's TIMESTAMP column value in the PIM_FOLDERS table, a CREATED mirror delta message is a mirror message whose DELTA_TYPE is CREATED, an UPDATED mirror delta message is a mirror message whose DELTA_TYPE is UPDATED, a DELETED mirror delta message is a mirror message whose DELTA_TYPE is DELETED and its TIMESTAMP is newer than its folder's TIMESTAMP.

Rule 1 combination does not trigger conflict resolution as the PIMReplicator 204 will not work with non-existent records in the PIM_MIRROR_CATALOG table. Rule 2 combination does not trigger conflict resolution as the PIMReplicator 204 will not work with non-updated server messages. Rule 3 is invoked when a server message is to be deleted but no corresponding mirror message in the PIM_MIRROR_CATALOG table can be found; this is not a conflict as the stage is consistent and neither mirror 102 nor server 104 have such message. Rule 4 is invoked when a new server message is to be created so there should not be any corresponding mirror messages in the PIM_MIRROR_CATALOG table before the replication is done. Then, PIMReplicator 204 should create a new mirror catalog message in the PIM_MIRROR_CATALOG table with its DELTA_TYPE set to CREATED, and its MODIFIER_ID set to the folder's FOLDER_ID, convert the server message to a new mirror data message in the corresponding PIM_XXX_MIRROR table, set the new mirror catalog data message's MIRROR_MESSAGE_ID column to the MIRROR_MESSAGE_ID column value of the new mirror catalog message, and set the new mirror catalog message's TIMESTAMP column to the TIMESTAMP column value of the new mirror data message.

Rule 5 is invoked when a server message is to be updated but no corresponding mirror message in the PIM_MIRROR_CATALOG table can be found; this should not be considered as a conflict because a server message could have been created first and then updated later by the messaging server 104 users before the synchronization starts. PIMReplicator 204 should do the same thing as in rule 4. Rule 6 combination does not trigger conflict resolution as the PIMReplicator 204 will not work with non-updated mirror messages. Rule 7 combination does not trigger conflict resolution as PIMReplicator 204 will not work with non-updated mirror and server messages. Rule 8 is invoked when a server message is to be deleted and its corresponding mirror message is not altered. PIMReplicator 204 should check to see if there are no more PIM_MAP table entries which point to this mirror catalog message, and, if so, this mirror catalog message is deleted from PIM_MIRROR_CATALOG table; otherwise, the state of the mirror catalog message is changed to DELETED, its SERVER_MESSAGE_ID column to null, TIMSTAMP to CURRENT TIMESTAMP, and its MODIFIER_ID to the folder's FOLDER_ID, and the existing mirror data message is deleted from its corresponding PIM_XXX_MIRROR table.

Rule 9 combination could only happen when a server message ID is recycled and its matched mirror message is not altered. When this should happen, PIMReplicator 204 should create a new mirror catalog and mirror data message, log an error so that administrator is alarmed to check to see if a server has too many recycled server message IDs, check to see if there are no more PIM_MAP table entries which point to this mirror, catalog message, and if so delete this mirror catalog message from PIM_MIRROR_CATALOG table; otherwise, change the state of the existing mirror catalog message to DELETED, its SERVER_MESSAGE_ID column to null, its TIMESTAMP to CURRENT TIMESTAMP, and its MODIFIER_ID to the folder's FOLDER_ID, delete the existing mirror data message from its corresponding PIM_XXX_MIRROR table, create a new mirror catalog message in PIM_MIRROR_CATALOG table with its DELTA_TYPE set to CREATED, and its MODIFIER_ID set to the folder's FOLDER_ID, convert the server message to a new mirror data message in corresponding PIM_XXX_MIRROR table, set the new mirror data message's MIRROR_MESSAGE_ID column to the MIRROR_MESSAGE_ID column value of the new mirror catalog message, and set the new mirror catalog message's TIMESTAMP column to the TIMESTAMP column value of the new mirror data message.

Rule 10 is invoked when a server message is to be updated and its corresponding mirror message is not altered. Then, PIMReplicator 204 converts the server message to a new mirror data message and updates the existing one in corresponding PIM_XXX_MIRROR table, and set the exiting mirror catalog message's TIMESTAMP column to the TIMESTAMP column value of the updated mirror data message, its DELTA_TYPE to UPDATED, and its MODIFIER_ID to the folder's FOLDER_ID. Rule 11 is invoked when a deleted mirror message is found with no matched server message in PIM_MIRROR_CATALOG table (e.g. it was created then deleted by client in some of the previous synchronization steps before it has a chance to be replicated); this is not a conflict as the state is consistent and neither mirror nor server should have the message. PIMReplicator 204 should check to see if there are no more PIM_MAP table entries which point to this mirror catalog message and delete this mirror catalog message from PIM_MIRROR_CATALOG table accordingly; otherwise, it does nothing.

Rule 12 is invoked when a DELETED mirror message whose matched server message is not altered by the server. Then, PIMReplicator 204 should delete the corresponding server message, and check to see if there are no more PIM_MAP table entries which point to this mirror catalog message, and, if so, delete this mirror catalog message from PIM_MIRROR_CATALOG table; otherwise, it sets the existing mirror catalog message's SERVER_MESSAGE_ID to null. Rule 13 is invoked when a server message is to be deleted and its corresponding mirror message is also found to be DELETED with newer TIMESTAMP than its folder's; then the PIMReplicator 204 should check to see if there are no more PIM_MAP table entries which point to this mirror catalog message, and, if so, delete this mirror catalog message from the PIM_MIRROR_CATALOG table; otherwise, it sets the existing mirror catalog message's SERVER_MESSAGE_ID column to null. Rule 14 combination could happen when the server 104 recycled a server message ID and mirror has deleted the corresponding mirror data. This is a conflict and PIMReplicator 204 should conduct the same conflict resolution as specified in rule 9 except that there is no need to execute step d (as the data has been deleted) and there is a modification in step c; otherwise, it sets the SERVER_MESSAGE_ID column to null and ignores its TIMESTAMP and MODIFIER_ID as it is already a deleted mirror message.

Rule 15 is invoked when a server message is to be updated but its corresponding mirror message is found to be deleted with newer TIMESTAMP than its folder's; this is a conflict and server wins by default. PIMReplicator 204 conducts the same resolution as specified in rule 14 except that there is no need to log an error. Rule 16 is used when a CREATED mirror catalog message has null SERVER_MESSAGE_ID in PIM_MIRROR_CATALOG table (e.g., it was created by client in one of the previous synchronizations before it had a chance to be replicated), PIMReplicator 204 converts the mirror data message to a new server message, creates a new server message in messaging server, and sets the mirror catalog message's SERVER_MESSAGE_ID column to the new server message ID. Rule 17 combination happens when a mirror message ID is recycled and it should be considered as a conflict. Then, the PIMReplicator 204 undoes mirror's creation as it is an error, logs an error so that the administrator can be alarmed to check and fix the system later, and conducts the same resolution as specified in rule 8.

Rule 18 combination happens when mirror recycled a catalog message ID and server is deleting the corresponding server message. This is a conflict and PIMReplicator 204 should take the same resolution as specified in rule 17 to undo the mirror's creation. Rule 19 combination happens when both mirror and server recycled the mirror message ID and server message ID, respectively. This is a conflict and PIMReplicator 204 logs an error so that the administrator can be alarmed to check and fix the system later, and conducts the same resolution as specified in rule 9 to undo the mirror's creation and create a new mirror catalog and mirror data message. Rule 20 combination happens when mirror recycled a catalog message ID and server is updating the corresponding server message. This is a conflict and PIMReplicator 204 conducts the same resolution as specified in rule 9 to undo the mirror's creation and create a new mirror catalog and mirror data message, except logging a recycled mirror message ID instead. Rule 21 is invoked when an updated mirror message is found with no matched server message in PIM_MIRROR_CATALOG table (e.g., it was created then updated by client in one of the previous synchronization steps before it has a chance to be replicated). PIMReplicator 204 conducts the same resolution as specified in rule 16.

Rule 22 is invoked when an UPDATED mirror message whose mapped server message is not altered by server. Then, PIMReplicator 204 adapter converts the mirror data message to a new server message and updates the server message in the messaging server. Rule 23 is invoked when a server message is to be deleted but its corresponding mirror message in PIM_MIRROR_CATALOG table is not altered; this is a conflict and server wins by default. PIMReplicator 204 conducts the same resolution as in rule 17 except logging a recycled server message ID instead. Rule 24 combination could only happen when server recycled a server message ID and mirror has updated its corresponding mirror data. This is a conflict and PIMReplicator 204 conducts the same resolution as specified in rule 9 to undo mirror's update and create a new mirror catalog and mirror data message. Rule 25 is done when a server message is to be updated and its corresponding mirror message in PIM_MIRROR_CATALOG table is UPDATED with a newer TIMESTAMP than its folder's. Since PIMReplicator 204 does not know which properties/columns were updated this should be considered as a conflict and server wins by default. PIMReplicator 204 conducts the same resolution as specified in rule 10 except that there is no need to change the DELTA_TYPE to UPDATED as it is UPDATED already.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method for providing a conflict detection and resolution in a mid-tier server of a multi-tier client-server communication system performing message synchronization in a client/mid-tier environment and performing replication in a mid-tier/server environment, comprising the steps of:

(a) defining a client/mid-tier conflict resolution look-up table listing all possible conflict states in the client/mid-tier environment and corresponding action rules;

(b) defining a mid-tier/server conflict resolution look-up table listing all possible conflict states in the mid-tier/server environment and corresponding action rules; and (c) for any detected conflict state, finding and executing the corresponding action rule.

2. The method according to claim 1, wherein the method being usable for platform-independent synchronization of multi-tier client-server communication messaging systems capable of supporting multiple messaging servers and applications on different client devices.

3. The method according to claim 1, wherein the step (c) invoking a conflict resolution routine comprising the steps of: matching of client and server messages, detecting a conflict state whenever an inconsistent to-be-applied operation being found in the matched client and server message pair, and creating, deleting or updating a message database record according to the returned action rule.

4. The method according to claim 3, wherein the conflict resolution routine being invoked for each client message by a synchronizing module and for each server message by a replicating module for comparing each client message with a corresponding mirror message, replicated from a corresponding server message.

5. A mid-tier server based conflict detection and resolution system of a multi-tier client-server communication system performing message synchronization in a client/mid-tier environment and performing replication in a mid-tier/server environment, comprising:

computer-based means for defining a client/mid-tier conflict resolution look-up table listing all possible conflict states in the client/mid-tier environment and corresponding action rules;

computer-based means for defining a mid-tier/server conflict resolution look-up table listing all possible conflict states in the mid-tier/server environment and corresponding action rules; and computer-based means for detecting conflict state and finding and executing the corresponding action rule.

6. The system according to claim 5, wherein the system being usable for platform-independent synchronization of multi-tier client-server communication messaging systems capable of supporting multiple messaging servers and applications on different client devices.

7. The system according to claim 5, wherein the means for detecting conflict state invoking a conflict resolution means for matching of client and server messages, detecting a conflict state whenever an inconsistent to-be-applied operation being found in the matched client and server message pair, and creating, deleting or updating a message database record according to the returned action rule.

8. The system according to claim 7, wherein the conflict resolution means being invoked for each client message by a synchronizing module and for each server message by a replicating module for comparing each client message with a corresponding mirror message, replicated from a corresponding server message.

9. A computer usable medium tangibly embodying a program of instructions executable by the computer to perform a computer-based method for providing a conflict detection and resolution in a mid-tier server of a multi-tier client-server communication system performing message synchronization in a client/mid-tier environment and performing replication in a mid-tier/server environment, comprising the steps of:

(a) defining a client/mid-tier conflict resolution look-up table listing all possible conflict states in the client/mid-tier environment and corresponding action rules;

(b) defining a mid-tier/server conflict resolution look-up table listing all possible conflict states in the mid-tier/server environment and corresponding action rules; and (c) for any detected conflict state, finding and executing the corresponding action rule.

10. The method according to claim 9, wherein the method being usable for platform-independent synchronization of multi-tier client-server communication messaging systems capable of supporting multiple messaging servers and applications on different client devices.

11. The method according to claim 9, wherein the step (c) invoking a conflict resolution routine comprising the steps of matching of: client and server messages, detecting a conflict state whenever an inconsistent to-be-applied operation being found in the matched client and server message pair, and creating, deleting or updating a message database record according to the returned action rule.

12. The method according to claim 11, wherein the conflict resolution routine being invoked for each client message by a synchronizing module and for each server message by a replicating module for comparing each client message with a corresponding mirror message, replicated from a corresponding server message.

* * * * *